(12) United States Patent
Huang et al.

(10) Patent No.: US 9,281,870 B2
(45) Date of Patent: Mar. 8, 2016

(54) METHOD AND TERMINAL FOR DATA TRANSMISSION BETWEEN TERMINALS

(75) Inventors: Hai Huang, Shenzhen (CN); Hongchao Wu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/385,145

(22) PCT Filed: May 25, 2012

(86) PCT No.: PCT/CN2012/076059
§ 371 (c)(1),
(2), (4) Date: Sep. 12, 2014

(87) PCT Pub. No.: WO2013/135004
PCT Pub. Date: Sep. 19, 2013

(65) Prior Publication Data
US 2015/0038078 A1    Feb. 5, 2015

(30) Foreign Application Priority Data

Mar. 14, 2012 (CN) .......................... 2012 1 0067245

(51) Int. Cl.
*H04B 5/00* (2006.01)
*G06F 3/044* (2006.01)
(Continued)

(52) U.S. Cl.
CPC ............ *H04B 5/0031* (2013.01); *G06F 1/1698* (2013.01); *G06F 3/044* (2013.01); *G06F 3/0416* (2013.01); *H04B 5/0012* (2013.01);
(Continued)

(58) Field of Classification Search
CPC ... G06F 1/1698; G06F 3/0416; H04B 5/0012; H04W 4/008; H04W 76/02

USPC ...................................... 455/41.1, 566, 41.2
See application file for complete search history.

(56) References Cited

U.S. PATENT DOCUMENTS

| 2005/0025078 A1 | 2/2005 | Hwang |
| 2011/0304583 A1 | 12/2011 | Kruglick |
| 2011/0314374 A1 | 12/2011 | Chae |

FOREIGN PATENT DOCUMENTS

| CN | 102340332 | 2/2012 |
| EP | 2 056 214 | 5/2009 |

(Continued)

OTHER PUBLICATIONS

International Search Report mailed Jan. 3, 2013, from related international application No. PCT/CN2012/076059.

(Continued)

*Primary Examiner* — Eugene Yun
(74) *Attorney, Agent, or Firm* — Foley & Lardner LLP

(57) ABSTRACT

Disclosed is a method for data transmission between terminals and a terminal. The method is applied between a first terminal and a second terminal, with a first capacitive touch screen set on the first terminal and a second capacitive touch screen set on the second terminal, and the method includes: the first terminal transforms the information to be transferred into binary data, then correspondingly applies a voltage to the electrodes involved in data transmission on the first capacitive touch screen and forms corresponding electric field distribution information; when the first capacitive touch screen contacts with the second capacitive touch screen, the second terminal decodes the information to be transferred according to the detected electric field distribution information currently on the first capacitive touch screen.

10 Claims, 4 Drawing Sheets

(51) Int. Cl.
  *G06F 1/16* (2006.01)
  *G06F 3/041* (2006.01)
  *H04W 4/00* (2009.01)
  *H04W 76/02* (2009.01)
  *H04W 88/06* (2009.01)

(52) U.S. Cl.
  CPC ............. *H04W 4/008* (2013.01); *H04W 76/02* (2013.01); *H04W 88/06* (2013.01)

(56) References Cited

FOREIGN PATENT DOCUMENTS

| WO | WO-2011155939 | 12/2011 |
|----|---------------|---------|
| WO | WO-2012022260 | 2/2012  |

OTHER PUBLICATIONS

European Search Report dated Feb. 11, 2015, from related European patent application No. 12870958.1.

METHOD AND TERMINAL FOR DATA TRANSMISSION BETWEEN TERMINALS

CROSS-REFERENCE TO RELATED APPLICATIONS

The present application is a U.S. National Phase of International Patent Application No. PCT/CN2012/076059, filed May 25, 2012, which claims priority from Chinese Patent Application No. 201210067245.7, filed Mar. 14, 2012. The contents of these applications are incorporated herein by reference in their entirety.

TECHNICAL FIELD

The patent document relates to the field of data communication technologies, and more particularly, to a method for data transmission between terminals and a terminal.

BACKGROUND OF THE INVENTION

Currently, there are a variety of touch-control technologies, comprising: Projected Capacitive, Single-touch Resistive, Multi-touch Resistive, Surface Acoustic Wave (referred to as SAW), infrared (referred to as IR), Electromagnetic Digitizer (referred to as EMR). In-cell/On-cell (place the projected capacitive touch screen into the display component), Surface Capacitive, Dispersive Signal Technology (referred to as DST), Acoustic Pulse Recognition (referred to as APR), Camera-Based Optical and force-sensing and so on. The projected capacitive multi-touch screen has been successfully applied to the phone in 2007.

At present, when a large amount of data communication in the near field is performed between mobile devices, or between a mobile device and other terminal device, it needs to manually connect the data cable, or manually enter the addresses of Bluetooth and WIFI (Wireless Fidelity) and so on to establish data communication connection between the devices. These steps seem complicated in the current modern fast-paced life.

SUMMARY OF THE INVENTION

The technical problem to be solved in the patent document is to provide a method for data transmission between terminals and a terminal, to simplify the steps of data communication between devices, to make the data communication more intuitive and natural, thereby improving the user experience.

To solve the abovementioned problem, the patent document provides a method for data transmission between terminals to be applied between a first terminal and a second terminal, and said first terminal is equipped with a first capacitive touch screen, and said second terminal is equipped with a second capacitive touch screen, comprising:

said first terminal transforming information to be transferred into binary data, and accordingly applying a voltage on electrodes involved in data transmission on said first capacitive touch screen, to form a corresponding electric field distribution information;

when said first capacitive touch screen contacting with said second capacitive touch screen, said second terminal decoding said information to be transferred according to detected electric field distribution information currently on said first capacitive touch screen.

Preferably, said first terminal correspondingly applies a voltage to said electrodes involved in said data transmission on said first capacitive touch screen, comprising:

applying a high voltage to electrodes corresponding to data bits whose values are 1 in said binary data, and applying a low voltage to electrodes corresponding to data bits whose values are 0 in said binary data; or applying a low voltage to electrodes corresponding to data bits whose values are 1 in said binary data, and applying a high voltage to electrodes corresponding to data bits whose values are 0 in said binary data.

Preferably, said first terminal transforms said information to be transferred into binary data, comprising: said first terminal transforming said information to be transferred into binary data in accordance with an ASIC code encoding way.

Preferably, said information to be transferred is a Bluetooth address or WIFI address of said first terminal; after said second terminal decodes said Bluetooth address or WIFI address of said first terminal, it accordingly establishes a Bluetooth communication or WIFI communication with said first terminal based on the address information.

Preferably, before said first terminal transforms said information to be transferred into binary data, the method further comprises:

said first terminal informing said second terminal of notification information, comprising: electric field range, distance between said electrodes, the number of row electrodes and column electrodes, and electrodes involved in said data transmission.

Preferably, said first terminal applies a voltage to the edge row electrodes and column electrodes on said first capacitive touch screen, and informs said second terminal of the electric field range on said first terminal;

said first terminal applies a voltage to all the row electrodes and all the column electrodes on said first capacitive touch screen, and informs said second terminal of the number of corresponding electrodes and the distance between said electrodes on said first terminal;

said first terminal applies a voltage to the row electrodes or column electrodes involved in said data transmission, and informs said second terminal of said electrodes involved in said data transmission on said first capacitive touch screen;

said first terminal applies a voltage to the utmost edge electrode involved in said data transmission, and informs said second terminal of the position of the electrode in which the first bit of said binary data is located.

Preferably, said second terminal contacts with said first capacitive touch screen through said second capacitive touch screen, and after obtaining said notification information, it applies a voltage to all the electrodes on said second capacitive touch screen to generate an electric field array, and informs said first terminal that said notification information is received.

Accordingly, the patent document also provides a terminal, wherein said terminal is equipped with a capacitive touch screen, comprising:

an encoding unit, which is configured to: transform information to be transferred into binary data;

a voltage applying unit, which is configured to: accordingly apply a voltage to electrodes involved in data transmission on said capacitive touch screen according to said binary data obtained by said encoding unit, and form corresponding electric field distribution information;

a detecting unit, which is configured to: when contacting with a capacitive touch screen of other terminal, detect the electric field distribution information on said capacitive touch screen of said other terminal;

a decoding unit, which is configured to: decode the information transmitted from said other terminal to the terminal according to the electric field distribution information detected by said detecting unit.

Preferably, said voltage applying unit is configured to: according to said binary data obtained by said encoding unit, correspondingly apply a voltage to said electrodes involved in said data transmission on said capacitive touch screen and form said corresponding electric field distribution information, comprising:

applying a high voltage to electrodes corresponding to data bits whose values are 1 in said binary data, and applying a low voltage to electrodes corresponding to data bits whose values are 0 in said binary data; or applying a low voltage to electrodes corresponding to data bits whose values are 1 in said binary data, and applying a high voltage to electrodes corresponding to data bits whose values are 0 in said binary data.

Preferably, said terminal further comprises: a connection establishment unit; said information transmitted from said other terminal to said terminal is a Bluetooth address or WIFI address of said first terminal;

said connection establishment unit is configured to: after said decoding unit decodes the Bluetooth address or WIFI address of said other terminal, correspondingly establish a Bluetooth communication or WIFI communication with said other terminal based on the address information.

Preferably, said voltage applying unit is further configured to: apply a voltage to edge row electrodes and column electrodes on said capacitive touch screen, inform said other terminal contacting with it via said capacitive touch screen of the electric field range on the terminal; apply a voltage to all the row electrodes or all the column electrodes on said capacitive touch screen, and inform said other terminal contacting with it via said capacitive touch screen of the number of corresponding electrodes and the distance between said electrodes on the terminal; apply a voltage to said row electrodes or said column electrodes involved in said data transmission, and inform said other terminal contacting with it via said capacitive touch screen of the electrodes involved in said data transmission on the terminal; apply a voltage to the utmost edge electrode involved in said data transmission, and inform said other terminal contacting with it via said capacitive touch screen of the position of the electrode in which the first of said binary data is located on the terminal.

Preferably, said voltage applying unit is configured to: contact with other terminal through said capacitive touch screen of the terminal, and after obtaining the electric field range, the number of electrodes and the distance between electrodes, the electrodes involved in said data transmission and the position of the electrode in which the first bit of the binary data is located of said other terminal, apply a voltage to all the electrodes on said capacitive touch screen to generate an electric field array, and inform said other terminal that the abovementioned information has been received.

After the embodiment of the present invention is applied, the communication connection between the terminal devices is simpler and more natural, which improves the user experience and eliminates the trouble of carrying data wires at any time, manually entering and searching for the Bluetooth and WIFI addresses and so on. The patent document can also be applied to the encryption and decryption, electronic payment and other fields, and the methods of the patent document is applicable not only to the capacitive touch screen, but also to the infrared touch screen, thus its commercial threshold is low and it has a broad prospect, after all, it is an era full of displays and touch-control and sharing all kinds of information anytime and anywhere in the future.

PREFERRED EMBODIMENTS OF THE PRESENT INVENTION

To make the objectives, technical solutions and advantages of the patent document more apparent, hereinafter in combination with the accompanying figures, the embodiments of the present invention will be described in detail. It should be noted that, in the case of no conflict, the embodiments in the present application and features in the embodiments might be combined arbitrarily with each other.

In terminal devices, particularly in mobile terminal devices (such as mobile phones), the touch screen has been used more and more frequently. In recent years, the capacitive touch screen has been developed rapidly and has almost become the standard configuration in high-end mobile phone terminals. The capacitive touch screen is composed of a series of crisscross row electrodes and column electrodes, and these electrodes stimulate a stable electrostatic field, and when there is a conductor (such as a finger) approaching, said conductor will be coupled with the electrodes, forming a coupling capacitor. The change of the coupling capacitor has a corresponding effect on said electrostatic field, and the touching location of the conductor can be measured by locating the changing position of said electrostatic field. In view of the abovementioned principle, when a touch screen applied with a voltage contacts with another touch screen, similarly the electric field on another touch screen changes, thus achieving communication between the touch screens.

Specifically, if only the row electrodes or the column electrodes can the capacitive touch screen are applied with a voltage, it can constitute an electric field with alternating high and low potentials, and due to the interaction between electric fields, the electric field can be detected by another capacitive touch screen contacting with it.

Figure 1:
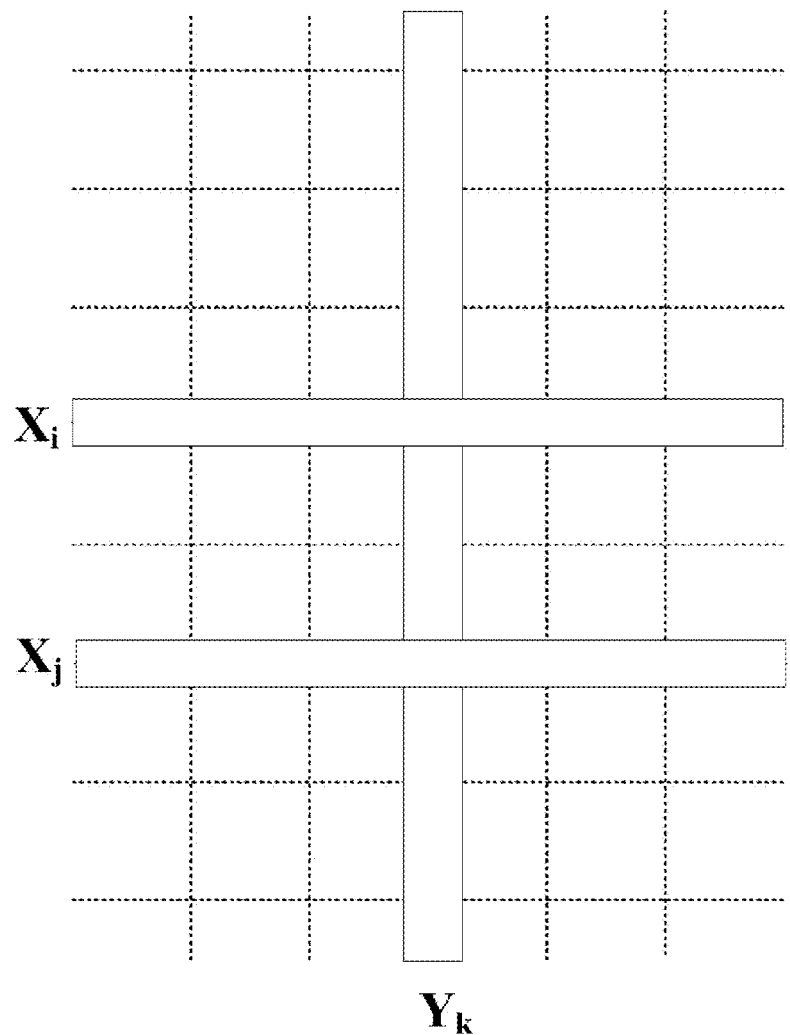
FIG. 1 is a schematic diagram of the electric field distribution after the electrodes on a capacitive touch screen is applied with a voltage.

FIG. 1 shows a schematic diagram of electric field distribution after the electrodes on a capacitive touch screen is applied with a voltage, and the dotted lines in FIG. 1 represent the row electrodes and column electrodes on the capacitive touch screen, and the electrodes Xi, Xj and Yk on said capacitive touch screen in FIG. 1 are applied with a voltage, the electric field at these positions changes.

Thus, after said terminal device transforms the information to be transferred (such as the Bluetooth or WIFI address, and so on) into the binary data, it applies a voltage to the corresponding row electrodes or column electrodes to form an electric field, so as to perform the transmission between two contacting terminal devices via the touch screen.

When using the abovementioned method to communicate between the capacitive touch screens, although the speed is relatively slow, it can quickly transfer the Bluetooth or WIFI addresses and so on of two terminal devices that contact with each other, so as to establish a Bluetooth or WIFI communication connection between two devices, thereby quickly implementing the subsequent large amount of data communication between devices. The abovementioned method can be used to transmit small amount of data directly.

Since the birth of the touch screen, the touch screen has been used as a sensor (input device) rather than an actuator (output device), the patent document pioneers the use of said touch screen as an actuator to achieve the purpose of communicate between the devices through touching.

In the following, the implementation of the technical solution will be described in further detail.

Figure 2:
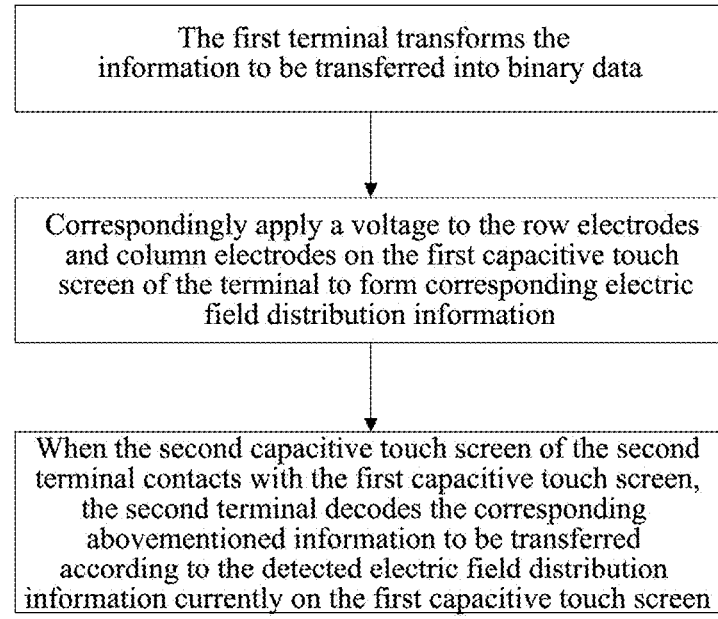
FIG. 2 is a flow chart showing the method for data transmission between the terminals in accordance with an embodiment of the present invention.

As shown in FIG. 2, in a specific communication, the first terminal transforms the information to be transferred (such as the Bluetooth address, WIFI address or address book of the device and so on) into the binary data, and accordingly applies a voltage to the row electrodes or the column electrodes on the first capacitive touch screen in the terminal to form corresponding electric field distribution information.

When the first capacitive touch screen contacts with the second capacitive touch screen on the second terminal, the second terminal can decode out the corresponding abovementioned information to be transferred in accordance with the detected electric field distribution information currently on the first capacitive touch screen. If the information to be transferred is the Bluetooth address or the WIFI address of first terminal, the second terminal establishes a Bluetooth or WIFI connection with the first terminal, so as to achieve data communication through touching.

In a specific implementation, the first terminal transforms the formation to be transferred into an ASIC code (such as a binary data); and then the first terminal correspondingly applies a voltage to the electrodes on the first capacitive touch screen, to form an electric field distribution corresponding to the obtained binary data after transformation. Taking a piece of information whose binary data is "11011100" as an example, a high voltage is applied to the row electrodes where "1" is located, and a low voltage is applied to the row electrodes where "0" is located, and vice versa. The second terminal can obtain the corresponding binary data according to the high and low voltages detected on the corresponding electrodes, and then decode the information to be transferred in the first terminal.

There are two preconditions to achieve the above process:

1, it needs to achieve the following agreements between two terminals that communicate via the touch screen: a, agreeing on the same transmission frequency of binary data, to ensure the synchronization of data transmission between two terminals. b, agreeing that the number of row electrodes is greater than or equal to the number of column electrodes (that is, the electrode cluster with a larger number of electrodes is agreed as the row electrodes), when performing the transmission of binary data, the row electrodes are utilized to transfer information by default. When the number of row electrodes is greater than or equal to 4 but less than 8, 4 of the electrodes are utilized at one time to transfer half a byte (4 bits), and when the number of row electrodes is greater than or equal to 8 but less than 15, 8 of the electrodes are utilized at one time to transfer one byte (8 bits), and when the number of row electrodes is greater than or equal to 16 but less than 24, 16 of the electrodes are utilized at one time to transfer two bytes (16 bits), the remaining cases can be deduced from the above, and transferring the integral number of bytes at one time is taken as the principle. If the number of row electrodes is less than 4, only one binary data is transferred at one time (such case rarely occurs, according to the agreement that the number of row electrodes is greater than or equal to the number of column electrodes and according to the general design principles of the capacitive touch screen, the distance between the two adjacent electrodes is approximately 5 mm, and at this time it can be known that the long side of the touch screen is only about 10 mm).

Figure 3A:
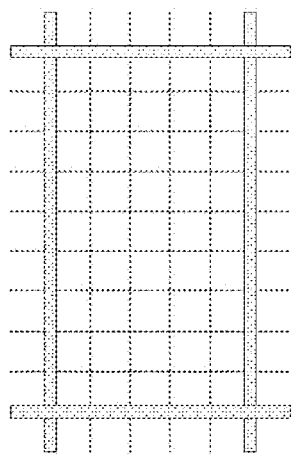
FIG. 3(a)~3(d) are schematic diagrams of the case that the notification information transmitted between the terminals is the change of electric field in accordance with an embodiment of the present invention.
Figure 3B:
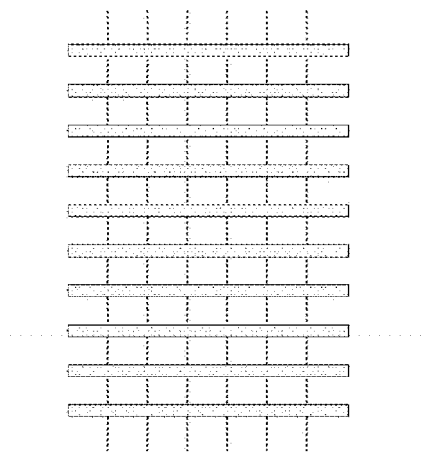
Figure 3C:
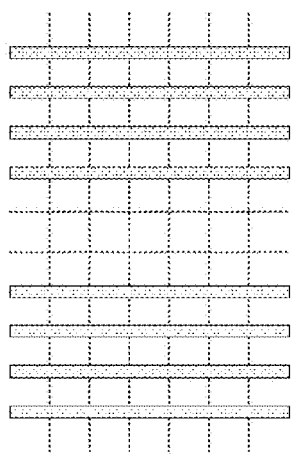
Figure 3D:
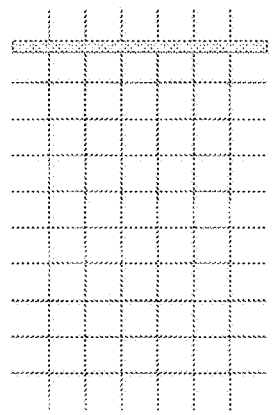

2, before carrying out the transmission of binary data, the first terminal needs to inform the second terminal of its electric field range, distance between the electrodes, the number of row electrodes and column electrodes, the electrodes involved in the transmission of binary data, the order of data transmission and other notification information. Assume that the touch screen of first terminal has 10 row electrodes and 6 column electrodes. As shown in FIG. 3(a), the touch screen of first terminal applies a voltage to the utmost edge row and column electrodes, to inform the second terminal of the electric field range on the touch screen of first terminal; as shown in FIG. 3(b), the touch screen of first terminal applies a voltage to all the row electrodes (please note the agreement, the number of row electrodes is greater than or equal to the number of column electrodes) to inform the second terminal of the number of row electrodes and the distance between the electrodes on the touch screen of first terminal; as shown in FIG. 3(c), the touch screen of first terminal applies a voltage to the row electrodes involved in the transmission of binary data according to the agreement of the previous precondition, to inform the second terminal of the electrodes involved in the transmission of binary data on the touch screen of first terminal; as shown in FIG. 3(d), the touch screen of first terminal applies a voltage to the utmost edge row electrode involved in the transmission of binary data, to inform the second terminal of the electrode in which the first bit of the binary data encoded by the touch screen of first terminal is located, and the remaining binary data are arranged backward in order. After the touch screen of the second terminal acquires all of the abovementioned information, the touch screen of the second terminal applies a voltage to all its own electrodes to generate an electric field array (confirmation pattern), to inform the touch screen of first terminal that the information has been received and a data communication can be carried out.

Figure 4:
FIG. 4 is a schematic diagram of transferring images on a phone to another terminal after using the abovementioned method to transfer the WIFI in accordance with an embodiment of the present invention.

Take a video call and sharing the video in real time with the family as an example. One person uses the terminal device A to have a video call with his/her parents in remote distance, while the family requests him/her to share the video, and this person may contact his/her terminal device A with the display device B, and communicate and transfer the Bluetooth or WIFI addresses and so on of the devices via the capacitive touch screens with each other, and after a Bluetooth or WIFI communication of devices is established, this person just gently slides the touch screen in order to slide the video pictures to the display device B, as shown in FIG. 4.

The abovementioned method can be directly applied to the small amount of data transmission, and for example, it can be applied to the field of encryption and decryption. Similar to the key in everyday life, the user can write the password into a mobile terminal device with a capacitive touch screen, and when the user needs to open a box or door, he/she takes out the abovementioned mobile device: to make the induction occur between its capacitive touch screen and another touch screen on the box or door (touch communication), if the password matches, the processor on the box or door is informed to open the box or door.

The abovementioned method may be applied to the field of electronic payments, such as storing the balance and other data into the mobile terminal device in the form of encryption, and when shopping or traveling, the capacitive touch screen of mobile terminal device directly contacts with the touch screen of the cashing device to complete the payment.

In the present embodiment, a terminal on which a capacitive touch screen is provided comprises:

an encoding unit, which is used to transform the information to be transferred into binary data;

a voltage applying unit, which is used to accordingly apply a voltage to electrodes involved in data transmission on said capacitive touch screen according to said binary data obtained by said encoding unit, and form corresponding electric field distribution information;

a detecting unit, which is used to, when in contact with a capacitive touch screen on other terminal, detect the electric field distribution information of the capacitive touch screen of said other terminal;

a decoding unit, which is used to decode the information transferred from said other terminal to the terminal according to the electric field distribution information detected by said detecting unit.

Preferably, said voltage applying unit is used to correspondingly apply a voltage to the electrodes involved in the data transmission on said capacitive touch screen according to said binary data obtained by said encoding unit, and form the corresponding electric field distribution information, specifically comprising that:

said voltage applying unit is used to apply a high voltage to electrodes corresponding to data bits whose values are 1 in said binary data, and apply a low voltage to electrodes corresponding to data bits whose values are 0 in said binary data; or to apply a low voltage to electrodes corresponding to data bits whose values are 1 in said binary data, and apply a high voltage to electrodes corresponding to data bits whose values are 0 in said binary data.

Preferably, said terminal further comprises: a connection establishment unit;

the information transferred from said other terminals to the terminal is the Bluetooth address or WIFI address of said first terminal;

said connection establishment unit is used to: after said decoding unit decodes the Bluetooth address or WIFI address of said other terminal, correspondingly establish a Bluetooth communication or WIFI communication with said other terminal based on the address information.

Preferably, said voltage applying unit is further used to apply a voltage to the edge row electrodes and column electrodes on the capacitive touch screen, and inform said other terminal contacting with it via the capacitive touch screen of the electric field range on the terminal:

said voltage applying unit is further used to apply a voltage to all the row electrodes or all the column electrodes on said capacitive touch screen, and inform said other terminal contacting with it via said capacitive touch screen of the number of corresponding electrodes and the distance between the electrodes on the terminal;

said voltage applying unit is further used to apply a voltage to the row electrodes or the column electrodes involved in the data transformation, and inform said other terminal contacting with it via the capacitive touch screen of the electrodes involved in the data transmission on the terminal;

said voltage applying unit is used to apply a voltage to the utmost edge electrode involved in the data transmission, and inform said other terminal contacting with it via said capacitive touch screen of the position of the electrode in which the first bit of binary data is located on the terminal.

Preferably, after the terminal contacts with said other terminal via said capacitive touch screen and obtains the electric field range, the number of electrodes and the distance between electrodes, the electrodes involved in said data transmission and the position of the electrode in which the first bit of the binary data is located of said other terminal, said voltage applying unit applies a voltage to all the electrodes on said capacitive touch screen to generate an electric field array and inform said other terminal that the abovementioned information is received.

Those ordinarily skilled in the art can understand that all or some of steps of the abovementioned method may be implemented by the programs instructing the relevant hardware, and said programs may be stored in a computer-readable storage medium, such as read only memory, magnetic or optical disk. Optionally, all or some of the steps of the abovementioned embodiments may also be implemented by using one or more integrated circuits. Accordingly, each module/unit in the above-mentioned embodiment may be realized in the form of hardware or software function module. The patent document is not limited to any specific form of hardware and software combinations.

The above description is only preferred embodiments of the present invention, and is not intended to limit the patent document. According to the content of the patent document, the patent document may have a variety of other embodiments, and without departing from the spirit and principle of the patent document, those ordinarily skilled in the art can make a variety of changes and modifications according to the patent document, and all changes, equivalent replacements and improvements made within the spirit and principle of the patent document should be included within the protection scope of the patent document.

INDUSTRIAL APPLICABILITY

After the embodiment of the present invention is applied, the communication connection between the terminal devices is simpler and more natural, which improves the user experience and eliminates the trouble of carrying data wires at any time, manually entering and searching for the Bluetooth and WIFI addresses and so on. The patent document can also be applied to the encryption and decryption, electronic payment and other fields, and the methods of the patent document is applicable not only to the capacitive touch screen, but also to the infrared touch screen and so on, thus its commercial threshold is low and it has a broad prospect, after all, it is an era full of displays and touch-control and sharing all kinds of information anytime and anywhere in the future.

What we claim is:

1. A method for data transmission between terminals, applied between a first terminal and a second terminal, said first terminal equipped with a first capacitive touch screen and said second terminal equipped with a second capacitive touch screen, comprising:

said first terminal transforming information to be transferred into binary data, and accordingly applying a voltage to electrodes involved in data transmission on said first capacitive touch screen, and forming corresponding electric field distribution information;

when said first capacitive touch screen contacts with said second capacitive touch screen, said second terminal decoding said information to be transferred according to detected electric field distribution information currently on said first capacitive touch screen;

wherein before said first terminal transforms said information to be transferred into binary data, the method further comprises:

said first terminal informing said second terminal of information, comprising: an electric field range, a distance between electrodes, a number of row electrodes, a number of column electrodes, and which electrodes are involved in data transmission;

wherein, said first terminal applies a voltage to edge row electrodes and edge column electrodes on said first capacitive touch screen, to inform said second terminal of the electric field range on said first terminal;

said first terminal applies a voltage to all of said row electrodes and all of said column electrodes on said first capacitive touch screen, to inform said second terminal of the number of row electrodes and the number of column electrodes and a distance between electrodes on said first terminal;

said first terminal applies a voltage to row electrodes or column electrodes involved in said data transmission, to inform said second terminal of which electrodes are involved in said data transmission on said first capacitive touch screen; and said first terminal applies a voltage to an utmost edge electrode involved in said data transmission, to inform said second terminal of a position of an electrode in which a first bit of said binary data is located.

2. The method of claim 1, wherein,
said first terminal correspondingly applying a voltage to said electrodes involved in said data transmission on said first capacitive touch screen, comprises:
applying a high voltage to electrodes corresponding to data bits whose values are 1 in said binary data, and applying a low voltage to electrodes corresponding to data bits whose values are 0 in said binary data; or
applying a low voltage to electrodes corresponding to data bits whose values are 1 in said binary data, and applying a high voltage to electrodes corresponding to data bits whose values are 0 in said binary data.

3. The method of claim 1, wherein,
said first terminal transforming said information to be transferred into binary data, comprises:
said first terminal transforming said information to be transferred into binary data in accordance with an ASIC code encoding way.

4. The method of claim 3, wherein,
said information to be transferred is a Bluetooth address or wireless fidelity (WIFI) address of said first terminal; after said second terminal decodes said Bluetooth address or WIFI address of said first terminal, said second terminal accordingly establishes a Bluetooth communication or WIFI communication with said first terminal based on the address information.

5. The method of claim 1, wherein,
said information to be transferred is a Bluetooth address or wireless fidelity (WIFI) address of said first terminal; after said second terminal decodes said Bluetooth address or WIFI address of said first terminal, said second terminal accordingly establishes a Bluetooth communication or WIFI communication with said first terminal based on the address information.

6. The method of claim 1, wherein,
said second terminal contacts with said first capacitive touch screen via said second capacitive touch screen, and after obtaining said notification information, said second terminal applies a voltage to all electrodes on said second capacitive touch screen to generate an electric field array, informing said first terminal that said notification information has been received.

7. A terminal, wherein said terminal equipped with a capacitive touch screen, comprising:
an encoding unit, which is configured to: transform information to be transferred into binary data;
a voltage applying unit, which is configured to: accordingly apply a voltage to electrodes involved in data transmission on said capacitive touch screen according to said binary data obtained by said encoding unit, and form corresponding electric field distribution information;
a detecting unit, which is configured to: when contacting with a capacitive touch screen of an other terminal, detect the electric field distribution information on said capacitive touch screen of said other terminal;
a decoding unit, which is configured to: decode information transferred from said other terminal to said terminal according to the electric field distribution information detected by said detecting unit;
wherein, said voltage applying unit is further configured to:
apply a voltage to edge row electrodes and edge column electrodes on said capacitive touch screen, to inform said other terminal contacting with said terminal via said capacitive touch screen of an electric field range on said terminal;
apply a voltage to all row electrodes or all column electrodes on said capacitive touch screen, to inform said other terminal contacting with said terminal via said capacitive touch screen of a number of the row electrodes or the column electrodes, and a distance between electrodes on said terminal;
apply a voltage to row electrodes or column electrodes involved in said data transmission, to inform said other terminal contacting with said terminal via said capacitive touch screen of which electrodes are involved in said data transmission on said terminal; and
apply a voltage to an utmost edge electrode involved in said data transmission, to inform said other terminal contacting with said terminal via said capacitive touch screen of a position of an electrode in which a first bit of said binary data is located.

8. The terminal of claim 7, wherein,
said voltage applying unit is configured to: according to said binary data obtained by said encoding unit, correspondingly apply a voltage to said electrodes involved in said data transmission on said capacitive touch screen and form said corresponding electric field distribution information, comprising:
applying a high voltage to electrodes corresponding to data bits whose values are 1 in said binary data, and applying a low voltage to electrodes corresponding to data bits whose values are 0 in said binary data; or
applying a low voltage to electrodes corresponding to data bits whose values are 1 in said binary data, and applying a high voltage to electrodes corresponding to data bits whose values are 0 in said binary data.

9. The terminal of claim 7, further comprising: a connection establishment unit;
said information transferred from said other terminal to said terminal is a Bluetooth address or WIFI address of said first terminal;
said connection establishment unit is configured to: after said decoding unit decodes the Bluetooth address or WIFI address of said other terminal, correspondingly establish a Bluetooth communication or WIFI communication with said other terminal based on the address information.

10. The terminal of claim 7, wherein,
after said terminal contacts with said other terminal via said capacitive touch screen and obtains an electric field range, the number of electrodes and a distance between electrodes, electrodes involved in data transmission and a position of an electrode in which a first bit of the binary data is located of said other terminal, apply a voltage to all electrodes on said capacitive touch screen to generate an electric field array and inform said other terminal that the abovementioned information has been received.

* * * * *